United States Patent
Brugard et al.

(10) Patent No.: US 11,657,060 B2
(45) Date of Patent: May 23, 2023

(54) UTILIZING INTERACTIVITY SIGNALS TO GENERATE RELATIONSHIPS AND PROMOTE CONTENT

(71) Applicant: MICROSOFT TECHNOLOGY LICENSING, LLC, Redmond, WA (US)

(72) Inventors: Hakon Brugard, Tromso (NO); Rune Devik, Tromso (NO); Stein Arild Jakobsen, Tromso (NO); Roger Hansen, Tromso (NO); Michael Taylor, Cambridge (GB); Magnus Mortensen, Tromso (NO); Bjornstein Lilleby, Tromso (NO); Fredrik Holm, Tromso (NO); Erlend Jensen, Tromso (NO); Torbjorn Helvik, Tromso (NO); Vidar Vikjord, Tromso (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/192,235

(22) Filed: Feb. 27, 2014

(65) Prior Publication Data
US 2015/0242473 A1 Aug. 27, 2015

(51) Int. Cl.
*G06F 16/248* (2019.01)
*G06F 16/93* (2019.01)
(Continued)

(52) U.S. Cl.
CPC ...... *G06F 16/248* (2019.01); *G06F 16/24578* (2019.01); *G06F 16/93* (2019.01); *G06Q 50/01* (2013.01)

(58) Field of Classification Search
CPC ......... G06F 17/30867; G06F 17/30554; G06F 17/30029; G06F 17/30386;
(Continued)

(56) References Cited

U.S. PATENT DOCUMENTS 6,434,556 B1  8/2002  Levin et al.
6,745,195 B1  6/2004  Kornfein et al.
(Continued)

FOREIGN PATENT DOCUMENTS

CN   1666279 A   9/2005
CN   101398836 A   4/2009
(Continued)

OTHER PUBLICATIONS

Bailly, Nestor, "Finding the Best Video Content Using the Power of the Social Graph", Published on: Jul. 17, 2013 Available at: http://iq.intel.com/iq/35820000/finding-the-best-video-content-using-the-power-of-the-social-graph.
(Continued)

*Primary Examiner* — Pierre M Vital
*Assistant Examiner* — Andalib F Lodhi

(57) ABSTRACT

An analysis application utilizes interactivity signals to generate relationships and promote content. One or more interactivity applications, such as a social networking application, are queried to retrieve interactivity signals. Interactivity signals include an interaction pattern that indicates a relationship between a user and relations of the user. A relationship graph is constructed based on the interactivity signals. Content associated with a user is promoted based on the relationship graph. A weight of the interactivity signals is adjusted to improve a ranking of the relationship graph and a ranking of the content.

20 Claims, 6 Drawing Sheets

(51) Int. Cl.
    *G06F 16/2457* (2019.01)
    *G06Q 50/00* (2012.01)

(58) Field of Classification Search
    CPC ............ G06F 17/30997; G06F 17/18; G06F 17/30914; G06F 17/30528; G06F 17/30864; G06F 17/3089; G06F 17/30011; G06F 17/3053; G06F 16/248; G06F 16/93; G06F 16/24578; G06Q 50/01; G02C 7/101; G02C 7/105; G02C 2202/18; B81B 7/02; B81B 2201/047
    See application file for complete search history.

(56) References Cited

U.S. PATENT DOCUMENTS

| | | |
|---|---|---|
| 7,031,961 B2 | 4/2006 | Pitkow et al. |
| 7,055,168 B1 | 5/2006 | Errico et al. |
| 7,143,091 B2 | 11/2006 | Charnock et al. |
| 7,444,344 B2 | 10/2008 | Galindo-Legaria et al. |
| 7,509,320 B2 | 3/2009 | Hess |
| 7,571,121 B2 | 8/2009 | Bezos et al. |
| 7,577,718 B2 | 8/2009 | Slawson et al. |
| 7,587,101 B1 | 9/2009 | Bourdev |
| 7,640,236 B1 | 12/2009 | Pogue |
| 7,756,945 B1 | 7/2010 | Andreessen et al. |
| 7,761,447 B2 | 7/2010 | Brill et al. |
| 7,783,630 B1 | 8/2010 | Chevalier et al. |
| 7,788,245 B1 | 8/2010 | Eddings |
| 7,873,641 B2 | 1/2011 | Frieden et al. |
| 7,890,501 B2 | 2/2011 | Lunt et al. |
| 7,945,571 B2 | 5/2011 | Wanker |
| 7,958,116 B2 | 6/2011 | House et al. |
| 7,962,481 B2 | 6/2011 | Ganesh et al. |
| 8,005,817 B1 | 8/2011 | Amer-Yahia et al. |
| 8,060,513 B2 | 11/2011 | Basco et al. |
| 8,065,383 B2 | 11/2011 | Carlson et al. |
| 8,117,197 B1 | 2/2012 | Cramer |
| 8,204,870 B2 | 6/2012 | Mukkamala et al. |
| 8,204,888 B2 | 6/2012 | Frieden et al. |
| 8,209,349 B2 | 6/2012 | Howes et al. |
| 8,214,325 B2 | 7/2012 | Navas |
| 8,266,144 B2 | 9/2012 | Tankovich et al. |
| 8,301,764 B2 | 10/2012 | Konig et al. |
| 8,312,056 B1 | 11/2012 | Peng et al. |
| 8,341,017 B2 | 12/2012 | Payne et al. |
| 8,341,150 B1 | 12/2012 | Riley et al. |
| 8,346,765 B2 | 1/2013 | Guo et al. |
| 8,346,950 B1 | 1/2013 | Andreessen et al. |
| 8,380,562 B2 | 2/2013 | Toebes et al. |
| 8,386,515 B2 | 2/2013 | Bent et al. |
| 8,463,795 B2 | 6/2013 | Van Hoff |
| 8,538,959 B2 | 9/2013 | Jin et al. |
| 8,548,996 B2 * | 10/2013 | Tareen .............. G06F 16/24578 707/732 |
| 8,572,477 B1 | 10/2013 | Moskovitz et al. |
| 8,600,981 B1 | 12/2013 | Chau et al. |
| 8,601,023 B2 | 12/2013 | Brave et al. |
| 8,615,442 B1 | 12/2013 | Kapur et al. |
| 8,751,621 B2 | 6/2014 | Vaynblat et al. |
| 8,751,636 B2 | 6/2014 | Tseng et al. |
| 8,775,334 B1 | 7/2014 | Lloyd et al. |
| 8,782,036 B1 | 7/2014 | Chen et al. |
| 8,799,296 B2 | 8/2014 | Agapiev |
| 8,812,947 B1 | 8/2014 | Maoz et al. |
| 8,825,649 B2 | 9/2014 | Heimendinger et al. |
| 8,825,711 B2 | 9/2014 | Chan et al. |
| 8,874,550 B1 | 10/2014 | Soubramanien et al. |
| 8,886,633 B2 | 11/2014 | Smyth et al. |
| 8,898,156 B2 | 11/2014 | Xu et al. |
| 8,909,515 B2 | 12/2014 | O'Neil et al. |
| 8,984,098 B1 | 3/2015 | Tomkins et al. |
| 8,996,629 B1 | 3/2015 | Datar et al. |
| 8,996,631 B2 | 3/2015 | Staddon et al. |
| 9,165,305 B1 | 10/2015 | Chandra et al. |
| 9,177,293 B1 | 11/2015 | Gagnon |
| 9,195,679 B1 | 11/2015 | Svendsen |
| 9,223,835 B1 | 12/2015 | Mazniker et al. |
| 9,223,866 B2 | 12/2015 | Marcucci et al. |
| 9,438,619 B1 * | 9/2016 | Chan .................. H04L 63/1433 |
| 9,514,191 B2 | 12/2016 | Solheim et al. |
| 9,542,440 B2 | 1/2017 | Wang et al. |
| 9,576,007 B1 | 2/2017 | Sivathanu |
| 11,030,208 B2 | 6/2021 | Helvik et al. |
| 11,308,456 B2 | 4/2022 | Beyer et al. |
| 11,308,919 B2 | 4/2022 | Morris et al. |
| 2001/0034859 A1 | 10/2001 | Swoboda et al. |
| 2002/0038299 A1 | 3/2002 | Zernik et al. |
| 2002/0091736 A1 | 7/2002 | Wall |
| 2002/0169759 A1 | 11/2002 | Kraft et al. |
| 2003/0025692 A1 | 2/2003 | Lu et al. |
| 2003/0071814 A1 | 4/2003 | Jou et al. |
| 2003/0115271 A1 | 6/2003 | Weissman |
| 2004/0103088 A1 | 5/2004 | Cragun et al. |
| 2004/0255237 A1 | 12/2004 | Tong |
| 2004/0267736 A1 | 12/2004 | Yamane et al. |
| 2005/0076240 A1 | 4/2005 | Appelman |
| 2005/0076241 A1 | 4/2005 | Appelman |
| 2005/0201535 A1 | 9/2005 | LaLonde |
| 2005/0203929 A1 | 9/2005 | Hazarika |
| 2005/0246420 A1 | 11/2005 | Little |
| 2005/0278321 A1 | 12/2005 | Vailaya et al. |
| 2005/0278325 A1 | 12/2005 | Mihalcea et al. |
| 2006/0004892 A1 | 1/2006 | Lunt et al. |
| 2006/0074883 A1 | 4/2006 | Teevan et al. |
| 2006/0123014 A1 | 6/2006 | Ng |
| 2006/0168036 A1 | 7/2006 | Schultz |
| 2006/0294085 A1 | 12/2006 | Rose et al. |
| 2007/0162443 A1 | 7/2007 | Liu et al. |
| 2007/0192306 A1 | 8/2007 | Papakonstantinou et al. |
| 2007/0208751 A1 | 9/2007 | Cowan et al. |
| 2008/0005064 A1 | 1/2008 | Sarukkai |
| 2008/0010337 A1 | 1/2008 | Hayes |
| 2008/0010350 A1 | 1/2008 | Chen et al. |
| 2008/0016053 A1 | 1/2008 | Frieden et al. |
| 2008/0086344 A1 | 4/2008 | Martini et al. |
| 2008/0091549 A1 | 4/2008 | Chang et al. |
| 2008/0097968 A1 | 4/2008 | Delgado et al. |
| 2009/0049053 A1 | 2/2009 | Barker et al. |
| 2009/0094233 A1 | 4/2009 | Marvit et al. |
| 2009/0125560 A1 | 5/2009 | Munekuni et al. |
| 2009/0132490 A1 | 5/2009 | Okraglik |
| 2009/0132516 A1 | 5/2009 | Patel et al. |
| 2009/0150866 A1 | 6/2009 | Schmidt |
| 2009/0182727 A1 | 7/2009 | Majko |
| 2009/0256678 A1 | 10/2009 | Ryu |
| 2009/0313295 A1 | 12/2009 | Blaxland et al. |
| 2009/0327271 A1 | 12/2009 | Amitay et al. |
| 2010/0063878 A1 | 3/2010 | Bachet et al. |
| 2010/0082695 A1 | 4/2010 | Hardt |
| 2010/0083151 A1 | 4/2010 | Lanza et al. |
| 2010/0169320 A1 | 7/2010 | Patnam et al. |
| 2010/0169326 A1 | 7/2010 | Ma et al. |
| 2010/0179874 A1 * | 7/2010 | Higgins .............. G06K 9/00664 705/14.53 |
| 2010/0185610 A1 | 7/2010 | Lunt et al. |
| 2010/0223266 A1 | 9/2010 | Balmin et al. |
| 2010/0268703 A1 | 10/2010 | Buck |
| 2010/0306185 A1 | 12/2010 | Smith |
| 2010/0312842 A1 | 12/2010 | Ladouceur et al. |
| 2010/0332330 A1 | 12/2010 | Goel et al. |
| 2011/0004831 A1 | 1/2011 | Steinberg et al. |
| 2011/0040617 A1 * | 2/2011 | Moonka ................ G06Q 30/02 705/14.46 |
| 2011/0055241 A1 | 3/2011 | Lewis |
| 2011/0060803 A1 | 3/2011 | Barlin et al. |
| 2011/0087644 A1 | 4/2011 | Frieden et al. |
| 2011/0099167 A1 | 4/2011 | Galbreath et al. |
| 2011/0145275 A1 | 6/2011 | Stewart |
| 2011/0145719 A1 | 6/2011 | Chen et al. |
| 2011/0153619 A1 * | 6/2011 | Carter .................. G06F 16/335 707/748 |
| 2011/0214046 A1 | 9/2011 | Haberman et al. |
| 2011/0218946 A1 | 9/2011 | Stern et al. |

(56) References Cited

U.S. PATENT DOCUMENTS

| | | |
|---|---|---|
| 2011/0231381 A1 | 9/2011 | Mercuri |
| 2011/0264737 A1 | 10/2011 | Skinner |
| 2011/0271224 A1 | 11/2011 | Cruz Moreno et al. |
| 2012/0030169 A1 | 2/2012 | Allen et al. |
| 2012/0047114 A1 | 2/2012 | Duan et al. |
| 2012/0054303 A1 | 3/2012 | Priyadarshan et al. |
| 2012/0066618 A1 | 3/2012 | Barker et al. |
| 2012/0076367 A1 | 3/2012 | Tseng |
| 2012/0078896 A1 | 3/2012 | Nixon et al. |
| 2012/0079004 A1 | 3/2012 | Herman |
| 2012/0084291 A1 | 4/2012 | Chung |
| 2012/0124041 A1 | 5/2012 | Bawri et al. |
| 2012/0158720 A1 | 6/2012 | Luan et al. |
| 2012/0158791 A1 | 6/2012 | Kasneci et al. |
| 2012/0167010 A1 | 6/2012 | Campbell et al. |
| 2012/0209859 A1* | 8/2012 | Blount .................. G06Q 10/06 707/748 |
| 2012/0209878 A1 | 8/2012 | Park et al. |
| 2012/0210240 A1 | 8/2012 | Neystadt et al. |
| 2012/0215771 A1 | 8/2012 | Steiner |
| 2012/0215773 A1* | 8/2012 | Si .......................... G06F 16/951 707/723 |
| 2012/0221558 A1 | 8/2012 | Byrne et al. |
| 2012/0221566 A1 | 8/2012 | Iwasa et al. |
| 2012/0223951 A1 | 9/2012 | Dunn et al. |
| 2012/0239618 A1 | 9/2012 | Kung |
| 2012/0254790 A1 | 10/2012 | Colombino et al. |
| 2012/0271807 A1 | 10/2012 | Smyth et al. |
| 2012/0290399 A1 | 11/2012 | England et al. |
| 2012/0290637 A1 | 11/2012 | Perantatos et al. |
| 2012/0296918 A1 | 11/2012 | Morris et al. |
| 2012/0304215 A1* | 11/2012 | McCarthy .......... H04N 5/44543 725/24 |
| 2012/0310922 A1 | 12/2012 | Johnson et al. |
| 2012/0311139 A1 | 12/2012 | Brave et al. |
| 2012/0323998 A1 | 12/2012 | Schoen et al. |
| 2012/0324002 A1 | 12/2012 | Chen |
| 2012/0324027 A1 | 12/2012 | Vaynblat et al. |
| 2012/0330908 A1 | 12/2012 | Stowe et al. |
| 2012/0330992 A1 | 12/2012 | Kanigsberg et al. |
| 2013/0006754 A1 | 1/2013 | Horvitz et al. |
| 2013/0013678 A1 | 1/2013 | Murthy |
| 2013/0031489 A1 | 1/2013 | Gubin et al. |
| 2013/0036230 A1 | 2/2013 | Bakos |
| 2013/0041896 A1 | 2/2013 | Ghani et al. |
| 2013/0054349 A1 | 2/2013 | Ogawa |
| 2013/0073280 A1 | 3/2013 | O'Neil et al. |
| 2013/0073568 A1 | 3/2013 | Federov et al. |
| 2013/0073632 A1 | 3/2013 | Fedorov et al. |
| 2013/0073979 A1 | 3/2013 | Shepherd et al. |
| 2013/0073983 A1 | 3/2013 | Rasmussen et al. |
| 2013/0080218 A1 | 3/2013 | Reapso |
| 2013/0086057 A1 | 4/2013 | Harrington et al. |
| 2013/0091149 A1 | 4/2013 | Dunn et al. |
| 2013/0097143 A1 | 4/2013 | Shenoy et al. |
| 2013/0097184 A1 | 4/2013 | Berkhin et al. |
| 2013/0103683 A1 | 4/2013 | Haveliwala et al. |
| 2013/0110638 A1 | 5/2013 | Ogawa |
| 2013/0110802 A1 | 5/2013 | Shenoy et al. |
| 2013/0110827 A1 | 5/2013 | Nabar et al. |
| 2013/0110978 A1 | 5/2013 | Gordon et al. |
| 2013/0124257 A1* | 5/2013 | Schubert ................ G06Q 30/02 705/7.29 |
| 2013/0124437 A1 | 5/2013 | Pennacchiotti et al. |
| 2013/0124613 A1 | 5/2013 | Plache et al. |
| 2013/0132138 A1 | 5/2013 | Doganata et al. |
| 2013/0151611 A1 | 6/2013 | Graham et al. |
| 2013/0155068 A1 | 6/2013 | Bier et al. |
| 2013/0159096 A1 | 6/2013 | Santhanagopal et al. |
| 2013/0167059 A1 | 6/2013 | Legris |
| 2013/0191416 A1 | 7/2013 | Lee et al. |
| 2013/0204706 A1 | 8/2013 | Tang et al. |
| 2013/0212081 A1 | 8/2013 | Shenoy et al. |
| 2013/0218885 A1 | 8/2013 | Satyanarayanan |
| 2013/0218899 A1 | 8/2013 | Raghavan et al. |
| 2013/0227011 A1 | 8/2013 | Sharma et al. |
| 2013/0238449 A1 | 9/2013 | Ferreira et al. |
| 2013/0238587 A1 | 9/2013 | Annau et al. |
| 2013/0238588 A1 | 9/2013 | Annau et al. |
| 2013/0246404 A1 | 9/2013 | Annau et al. |
| 2013/0246405 A1 | 9/2013 | Annau et al. |
| 2013/0246521 A1 | 9/2013 | Schacht et al. |
| 2013/0262588 A1 | 10/2013 | Barak et al. |
| 2013/0268973 A1 | 10/2013 | Archibong et al. |
| 2013/0288715 A1 | 10/2013 | Shieh et al. |
| 2013/0290323 A1 | 10/2013 | Saib |
| 2013/0298084 A1 | 11/2013 | Spivack et al. |
| 2013/0326369 A1 | 12/2013 | Buchanon |
| 2013/0332523 A1 | 12/2013 | Luu |
| 2013/0346329 A1 | 12/2013 | Alib-Bulatao et al. |
| 2014/0007860 A1 | 1/2014 | Lu |
| 2014/0013353 A1 | 1/2014 | Mathur |
| 2014/0032563 A1 | 1/2014 | Lassen et al. |
| 2014/0032664 A1 | 1/2014 | Wookey |
| 2014/0040008 A1 | 2/2014 | Belani et al. |
| 2014/0040244 A1 | 2/2014 | Rubinstein et al. |
| 2014/0040245 A1 | 2/2014 | Rubinstein et al. |
| 2014/0040246 A1 | 2/2014 | Rubinstein et al. |
| 2014/0040367 A1 | 2/2014 | Lessin et al. |
| 2014/0040370 A1 | 2/2014 | Buhr |
| 2014/0040729 A1 | 2/2014 | Marlow et al. |
| 2014/0041038 A1 | 2/2014 | Lessin et al. |
| 2014/0046982 A1 | 2/2014 | Chan et al. |
| 2014/0074602 A1 | 3/2014 | van Elsas et al. |
| 2014/0074856 A1* | 3/2014 | Rao ........................ G06Q 50/01 707/748 |
| 2014/0074888 A1 | 3/2014 | Potter et al. |
| 2014/0074934 A1* | 3/2014 | Van Hoff ............ G06F 17/3053 709/204 |
| 2014/0114986 A1 | 4/2014 | Bierner et al. |
| 2014/0156652 A1 | 6/2014 | Abiola |
| 2014/0164388 A1 | 6/2014 | Zhang |
| 2014/0173459 A1 | 6/2014 | Gaiser et al. |
| 2014/0181083 A1 | 6/2014 | Macho et al. |
| 2014/0181091 A1 | 6/2014 | Lassen et al. |
| 2014/0188899 A1 | 7/2014 | Whitnah et al. |
| 2014/0189530 A1* | 7/2014 | Anand .................. H04L 65/403 715/753 |
| 2014/0195605 A1 | 7/2014 | Kallayil |
| 2014/0195977 A1* | 7/2014 | Chang ............... G06F 16/24578 715/833 |
| 2014/0207860 A1 | 7/2014 | Wang et al. |
| 2014/0208234 A1* | 7/2014 | Amit .................... G06Q 30/0273 715/753 |
| 2014/0215351 A1 | 7/2014 | Gansca et al. |
| 2014/0229293 A1* | 8/2014 | Huang ............... G06Q 30/0273 705/14.69 |
| 2014/0278986 A1 | 9/2014 | Rouse et al. |
| 2014/0280080 A1 | 9/2014 | Solheim et al. |
| 2014/0280108 A1 | 9/2014 | Dunn et al. |
| 2014/0282029 A1 | 9/2014 | Vishria |
| 2014/0324850 A1 | 10/2014 | Magnaghi et al. |
| 2014/0330551 A1 | 11/2014 | Bao et al. |
| 2014/0330809 A1 | 11/2014 | Raina et al. |
| 2014/0330818 A1 | 11/2014 | Raina et al. |
| 2014/0330819 A1 | 11/2014 | Raina et al. |
| 2014/0337316 A1 | 11/2014 | Abuelsaad et al. |
| 2014/0344288 A1 | 11/2014 | Evans et al. |
| 2014/0351263 A1 | 11/2014 | Mcconnell et al. |
| 2014/0359023 A1* | 12/2014 | Homsany ................ H04L 51/08 709/206 |
| 2015/0039596 A1 | 2/2015 | Stewart |
| 2015/0039632 A1 | 2/2015 | Leppanen et al. |
| 2015/0046515 A1* | 2/2015 | Pei ...................... G06Q 30/0269 709/203 |
| 2015/0058758 A1 | 2/2015 | Tseng |
| 2015/0067505 A1 | 3/2015 | Metcalf et al. |
| 2015/0081449 A1* | 3/2015 | Ge ...................... G06F 17/30867 705/14.66 |
| 2015/0100644 A1 | 4/2015 | Gulik |
| 2015/0106191 A1* | 4/2015 | Ge ...................... G06Q 30/0275 705/14.45 |
| 2015/0120700 A1 | 4/2015 | Holm et al. |

(56) References Cited

U.S. PATENT DOCUMENTS

| | | | |
|---|---|---|---|
| 2015/0127677 | A1 | 5/2015 | Wang et al. |
| 2015/0142785 | A1 | 5/2015 | Roberts et al. |
| 2015/0187024 | A1* | 7/2015 | Karatzoglou .......... G06Q 50/01 |
| | | | 705/319 |
| 2015/0220531 | A1 | 8/2015 | Helvik et al. |
| 2015/0242402 | A1 | 8/2015 | Holm et al. |
| 2015/0248222 | A1 | 9/2015 | Stickler et al. |
| 2015/0248410 | A1 | 9/2015 | Stickler et al. |
| 2015/0248480 | A1 | 9/2015 | Miller et al. |
| 2015/0249715 | A1 | 9/2015 | Helvik et al. |
| 2015/0294138 | A1 | 10/2015 | Barak et al. |
| 2015/0363402 | A1 | 12/2015 | Jackson et al. |
| 2015/0363407 | A1 | 12/2015 | Huynh et al. |
| 2015/0379586 | A1 | 12/2015 | Mooney et al. |
| 2015/0381552 | A1 | 12/2015 | Vijay et al. |
| 2016/0034469 | A1 | 2/2016 | Livingston et al. |
| 2016/0070764 | A1 | 3/2016 | Helvik et al. |
| 2016/0117740 | A1 | 4/2016 | Linden et al. |
| 2016/0203510 | A1 | 7/2016 | Pregueiro et al. |
| 2017/0072002 | A1 | 3/2017 | Bafundo et al. |
| 2017/0091644 | A1 | 3/2017 | Chung et al. |
| 2017/0212931 | A1* | 7/2017 | Chen ................ G06F 16/24544 |
| 2018/0349452 | A1 | 12/2018 | Helvik et al. |
| 2019/0180204 | A1 | 6/2019 | Stickler et al. |
| 2021/0232631 | A1* | 7/2021 | Holm .................. G06F 16/9024 |
| 2021/0263917 | A1* | 8/2021 | Helvik .................... G06Q 50/01 |
| 2022/0222249 | A1 | 7/2022 | Holm et al. |

FOREIGN PATENT DOCUMENTS

| | | |
|---|---|---|
| CN | 102150161 A | 8/2011 |
| CN | 102298612 A | 12/2011 |
| CN | 102567326 A | 7/2012 |
| CN | 102693251 A | 9/2012 |
| CN | 102708168 A | 10/2012 |
| CN | 102906689 A | 1/2013 |
| CN | 102930035 A | 2/2013 |
| EP | 2409271 A2 | 1/2012 |
| EP | 2426634 A1 | 3/2012 |
| EP | 2764489 A1 | 8/2014 |
| WO | 2008097969 A2 | 8/2008 |
| WO | 2008/111087 A2 | 9/2008 |
| WO | 2010/029410 A1 | 3/2010 |
| WO | 2012129400 A2 | 9/2012 |
| WO | 2013/026095 A1 | 2/2013 |
| WO | 2013/043654 A2 | 3/2013 |
| WO | 2013/123550 A1 | 8/2013 |
| WO | 2013/173232 A1 | 11/2013 |

OTHER PUBLICATIONS

"Getting started with your My Site", Published on: Apr. 6, 2014 Available at: http://office.microsoft.com/en-in/sharepoint-server-help/getting-started-with-your-my-site-HA101665444.aspx.

"Bing Ads targeting—training", Published on: Mar. 31, 2013 Available at: http://advertise.bingads.microsoft.com/en-ca/cl/245/training/bing-ads-targeting.

"Campaign Element Template Parameters—Training", Retrieved on: Oct. 1, 2014 Available at: https://www-304.ibm.com/support/knowledgecenter/SSZLC2_7.0.0/com.ibm.commerce.management-center_customization.doc/concepts/csbcustargdef.htm.

"Connections Enterprise Content Edition", Published on: Nov. 22, 2013 Available at: http://www-03.ibm.com/software/products/en/connections-ecm/.

"Enterprise Search from Microsoft", Published on: Jan. 2007, Available at: https://www.google.co.in/url?sa=t&rct=j&q=&esrc=s&source=web&cd=2&cad=rja&ved=0CDMQFjAB&url=http%3A%2F%2Fdownload.microsoft.com%2Fdownload%2Fd%2F0%2F1%2Fd0165e6d-11cb-464b-b24a-c019d82def0d%2FEnterprise%2520Search%2520from%2520Microsoft.doc&ei=IAq9UqueHoTtrAe5yoC4Bg&usg=AFQjCNEax9yYC0KGTUhr-4bNIxTJpyyyhsA&bvm=bv.58187178,d.bmk.

"Facets for Enterprise Search Collections", Retrieved on: Jun. 17, 2014, Available at: http://pic.dhe.ibm.com/infocenter/analytic/v3r0m0/index.jsp?topic=%2Fcom.ibm.discovery.es.ad.doc%2Fiiysafacets.htm.

"How to Segment and Target Your Emails—Training", Published on: Aug. 15, 2014 Available at: http://www.marketo.com/_assets/uploads/How-to-Segment-and-Target-Your-Emails.pdf?20130828153321.

"Introducing Delve (codename Oslo) and the Office Graph", Published on: Mar. 11, 2014, Available at: http://blogs.office.com/2014/03/11/introducing-codename-oslo-and-the-office-graph/.

"Introduction to Managed Metadata", Retrieved on: Jun. 23, 2014 Available at: http://office.microsoft.com/en-001/office365-sharepoint-online-enterprise-help/introduction-to-managed-metadata-HA102832521.aspx.

"Persistent Search: Search's Next Big Battleground", Available at: http://billburnham.blogs.com/burnhamsbeat/2006/04/persistent_sear.html, Published on: Apr. 10, 2006, 3 pages.

"Turn search history off or on", retrieved from http://onlinehelp.microsoft.com/en-US/bing/ff808483.aspx, Retrieved date: Dec. 12, 2013, 1 page.

"Yammer the Enterprise Social Network", Published on: Sep. 9, 2013 Available at: https://about.yammer.com/product/feature-list/.

Amitay et al., "Social Search and Discovery using a Unified Approach", In Proceedings of the 20th ACM Conference on Hypertext and Hypermedia, Jun. 29, 2009, pp. 199-208.

Bobadilla et al., "Recommender Systems Survey", In Journal of Knowledge-Based Systems, vol. 46, Jul. 2013, pp. 109-132.

Daly et al., "Social Lens: Personalization around user Defined Collections for Filtering Enterprise Message Streams", In Proceedings of the Fifth International AAAI Conference on Weblogs and Social Media, Published on: Jul. 17, 2011, 8 pages.

Diaz et al., "SIGIR 2013 Workshop on Time Aware Information Access (#TAIA2013)", In Proceedings of the 36th International ACM SIGIR Conference on Research and Development in Information Retrieval, Aug. 1, 2013, 41 pages.

Elbassuoni et al., "Language-Model-Based Ranking for Queries on RDF-Graphs", In Proceedings of the 18th ACM Conference on Information and Knowledge Management, Nov. 2, 2009, 10 pages.

Fan et al., "Tuning Before Feedback: Combining Ranking Discovery and Blind Feedback for Robust Retrieval", Retrieved at http://filebox.vt.edu/users/wfan/paper/ARRANGER/p52-Fan.pdf, 27th Annual International ACM SIGIR Conference on Research and Development in Information Retrieval, Jul. 25, 2004, 8 pages.

Fazio, Stephanie, "How Social is Enterprise Search?", Published on: Mar. 14, 2012, Available at: http://blogs.opentext.com/vca/blog/1.11.647/article/1.26.2007/2012/3/14/How_Social_is_Enterprise_Search%3F.

Fox, Vanessa, "Marketing in the Age of Google", John Wiley & Sons, Mar. 8, 2012, 3 pages.

Giugno et al., "GraphGrep: A Fast and Universal Method for Querying Graphs", In Proceedings of the 16th International Conference on Pattern Recognition, vol. 2, Aug. 11, 2002, 4 pages.

Gruhl el al., "The Web beyond Popularity—A Really Simple System for Web Scale RSS", In Proceedings of the 15th International Conference on World Wide Web, May 23, 2006, pp. 183-192.

Guy et al., "Finger on the Pulse: The Value of the Activity Stream in the Enterprise", In Proceedings of 14th IFIP TC 13 International Conference on Human-Computer Interaction, Sep. 2, 2013, 18 pages.

Guy et al., "Personalized Recommendation of Social Software Items Based on Social Relations", In Proceedings of the Third ACM Conference on Recommender Systems, Oct. 2009, pp. 53-60.

Hackett, Wes, "Extending the Activity Feed with Enterprise Content", In Proceedings of ActivityFeed, Development, Featured, Sharepoint, Social Features, Jun. 16, 2011, 27 pages.

Hanada, Tetsuya, "Yammer—Enterprise Graph SharePoint", In Australian Sharepoint Conference, Jun. 11, 2013, 23 pages.

Josh, "Send Notifications to your Customers in their Timezone—training", Published on: Aug. 19, 2014 Available at: https://mixpanel.com/blog/2014/08/19/announcement-send-notifications-in-your-customer-s-timezone.

(56) References Cited

OTHER PUBLICATIONS

Kelly et al., "The Effects of Topic Familiarity on Information Search Behavior", Retrieved at http://www.ils.unc.edu/~dianek/kelly-jcd102.pdf, Joint Conference on Digital Libraries, Portland, Oregon, USA, Jul. 13, 2002, 2 pages.

Khodaei et al., "Social-Textual Search and Ranking", In Proceedings of the First International Workshop on Crowdsourcing Web Search, Apr. 17, 2012, 6 pages.

Kubica et al., "cGraph: A Fast Graph-Based Method for Link Analysis and Queries", In Proceedings of the IJCAI Text-Mining & Link-Analysis Workshop, Aug. 2003, 10 pages.

Li et al., "Personalized Feed Recommendation Service for Social Networks", In IEEE 2nd International Conference on Social Computing, Aug. 20, 2010, 8 pages.

Li et al., "Research Of Information Recommendation System Based On Reading Behavior", In International Conference on Machine Learning and Cybernetics, vol. 3, Jul. 12, 2008, 6 pages.

Liang et al., "Highlighting in Information Visualization: A Survey", In Proceedings of 14th International Conference Information Visualisation, Jul. 26, 2010, pp. 79-85.

Masuch, Lukas, "Hack: Enterprise Knowledge Graph—One Graph to Connect them All", Published on: Mar. 28, 2014, Available at : http://www.managementexchange.com/hack/enterprise-knowledge-graph-one-graph-connect-them-all.

Muralidharan et al., "Social Annotations in Web Search", In Proceedings of the ACM Annual Conference on Human Factors in Computing Systems, May 5, 2012, 10 pages.

Pecovnik, Simon, "Enterprise Graph Search—take 1", Published on: Jan. 28, 2014, Available at: http://www.ravn.co.uk/2014/01/28/enterprise-graph-search/.

Perer et al., "Visual Social Network Analytics for Relationship Discovery in the Enterprise", In IEEE Conference on Visual Analytics Science and Technology, Published on: Oct. 23, 2011, 9 pages.

Ronen et al., "Social Networks and Discovery in the Enterprise (SaND)", In Proceedings of the 32nd International ACM SIGIR Conference on Research and Development in Information Retrieval, Jul. 19, 2009, 1 page.

Roth et al., "Suggesting Friends Using the Implicit Social Graph", In Proceedings of the 16th ACM SIGKDD International Conference on Knowledge Discovery and Data Mining, Jul. 25, 2010, 9 pages.

Soussi, Rania, "Querying and Extracting Heterogeneous Graphs from Structured Data and Unstrutured Content", In Doctoral Dissertation, Ecole Centrale Paris, Jun. 22, 2012, 208 pages (1 page Abstract).

Ubbesen, Christian, "Enterprise Graph Search", Published on: Jan. 28, 2013, Available at: http://www.findwise.com/blog/enterprise-graph-search/.

Yap, Jamie, "Graph Search Capabilities Offer Enterprise Benefits", Published on: Feb. 14, 2013, Available at: http://www.zdnet.com/graph-search-capabilities-offer-enterprise-benefits-7000011304/.

Yeung, Ken, "Yammer Unveils the Open Graph for the Enterprise, to Help make Business Apps More Social", Published on: Oct. 29, 2012, Available at: http://thenextweb.com/insider/2012/10/29/yammer-using-the-enterprise-graph/?utm_source=feedburner&utm_medium=feed&utm_campaign=Feed:+TheNextWeb+(The+Next+Web+All+Stories).

Zhibao et al., "EISI: An Extensible Security Enterprise Search System", In 2nd International Conference on Computer Science and Network Technology, Dec. 29, 2012, pp. 896-900.

"Second Written Opinion Issued in PCT Application No. PCT/US2015/017407", dated Mar. 3, 2016, 9 Pages.

"International Search Report & Written Opinion Received for PCT Application No. PCT/US2015/017407", dated May 4, 2015, 12 Pages.

PCT International Preliminary Report on Patentability Issued in PCT Application No. PCT/US2015/017407, dated May 25, 2016, 10 Pages.

PCT International Preliminary Report on Patentability Issued In Application No. PCT/US2016/012399, dated Jul. 11, 2017, 9 Pages.

U.S. Appl. No. 14/188,079, Notice of Allowance dated Sep. 7, 2017, 7 pages.

Resnick, "Request for Comments: 5322", Network Working Group, Qualcomm Incorporated, 57 pages (Oct. 2008).

European Office Action in Application 15710653.5, dated Jul. 27, 2017, 8 pages.

"8 Things Marketers Ought to Know About Facebooks New Trending Feature", Retrieved from: https://web.archive.org/save/https://www.facebook.com/notes/brandlogist/8-things-marketers-ought-to-know-about-facebooks-new-trending-feature/650859898308191/, Jan. 30, 2014, 5 Pages.

"Trending—Definition and Synonyms", Retrieved from https://web.archive.org/web/20170618063522/http://www.macmillandictionary.com:80/us/dictionary/american/trending, Jul. 18, 2014, 1 Page.

Dayal, Priyanka, "How Many Tweets Make a Trend?", Retrieved from https://www.vuelio.com/uk/blog/how-many-tweets-make-a-trend/. Aug. 28, 2013, 5 Pages.

"Advisory Action Issued in U.S. Appl. No. 14/064,393", dated Jun. 6, 2019, 6 Pages.

"Final Office Action Issued in U.S. Appl. No. 14/064,393", dated Mar. 4, 2019, 19 Pages.

"Office Action Issued in European Patent Application No. 15771764.6", dated May 13, 2019, 9 Pages.

"First Office Action & Search Report Issued in Chinese Patent Application No. 201480058874.0", dated Dec. 5, 2018, 14 Pages.

"Final Office Action Issued in U.S. Appl. No. 14/194,700", dated May 20, 2019, 25 Pages.

"Notice Of Allowance Issued in U.S. Appl. No. 14/195,243", dated May 1, 2019, 10 Pages.

"Final Office Action Issued in U.S. Appl. No. 14/296,747", dated May 1, 2019, 30 Pages.

Bakhshandeh, et al.,"Personalized Search Based on Micro-Blogging Social Networks", In Proceedings of the CSI International Symposium on Artificial Intelligence and Signal Processing, May 2, 2012, 4 Pages.

Mishra, et al., "Improving Mobile Search through Location Based Context and Personalization", In Proceedings of the International Conference on Communication Systems and Network Technologies, May 11, 2012, 5 Pages.

"First Office Action and Search Report Issued in Chinese Patent Application No. 201580011895.1", dated Mar. 5, 2019, 18 Pages.

"Office Action Issued in European Patent Application No. 15710632.9", dated Feb. 18, 2019, 07 Pages.

"First Office Action and Search Report Issued in Chinese Patent Application No. 201580010703.5", dated Mar. 8, 2019, 12 Pages.

"Second Office Action and Search Report Issued in Chinese Patent Application No. 201480058874.0", dated Jun. 26, 2019, 14 Pages.

Yong Yin at al., An improved Search Strategy for Even Degree Distribution Networks, Jul. 2013, Academy Publisher, vol. 8, No. 7, pp. 1558-1565 (Year: 2013).

Jason J. Jung, Understanding information propagation on online social tagging systems, Nov. 4, 2012, Springer Science+ Business Media, Edition or vol. 48, pp. 745-754 (Year: 2012).

Barbie E. Keiser, Semisocial information Discovery, Novi Dec. 2013, Online searcher, pp. 16-22 (Year: 2013).

Anthony Stefanidis et al., Harvesting ambient geospatial information from social media feeds, Dec. 4, 2011, GeoJournal, Edition or vol. 78, pp. 319-338 (Year: 2011).

"Final Office Action Issued in U.S. Appl. No. 14/593,650", dated Jan. 4, 2019, 35 Pages.

"Second Office Action Issued in Chinese Patent Application No. 201580011895.1", dated Aug. 9, 2019, 6 Pages.

"Non Final Office Action Issued in U.S. Appl. No. 16/275,386", dated Aug. 29, 2019, 36 Pages.

"Non Final Office Action Issued in U.S. Appl. No. 14/296,747", dated Jan. 30, 2020, 32 Pages.

"Notice of Allowance Issued in U.S. Appl. No. 16/275,386", dated Mar. 6, 2020, 10 Pages.

Oyama., et al., "Analysis of Topics and Relevant Documents for Navigational Retrieval on the Web", In Proceedings of International Workshop on Challenges in Web Information Retrieval and Integration, Apr. 8, 2005, 6 Pages.

(56) References Cited

OTHER PUBLICATIONS

Chen, et al., "Towards Topic Trend Prediction on a Topic Evolution Model with Social Connection", In Proceedings of ACM International Conferences on Web Intelligence and Intelligent Agent Technology, Dec. 4, 2012, 5 Pages.
"Non-Final Office Action Issued in U.S. Appl. No. 14/064,393", dated Sep. 26, 2019, 20 Pages.
"Second Office Action Issued in Chinese Patent Application No. 201580010703.5", dated Oct. 24, 2019, 5 Pages.
"Non Final Office Action Issued in U.S. Appl. No. 14/194,700", dated Nov. 5, 2019, 27 Pages.
"Non Final Office Action Issued in U.S. Appl. No. 15/833,453", dated Dec. 17, 2019, 42 Pages.
"Final Office Action Issued in U.S. Appl. No. 15/833,453", dated May 4, 2020, 30 Pages.
"Final Office Action Issued in U.S. Appl. No. 14/296,747", dated Sep. 3, 2020, 31 Pages.
"Non Final Office Action Issued in U.S. Appl. No. 15/833,453", dated Sep. 11, 2020, 36 Pages.
Pradel, et al., "Natural Language Query Interpretation into SPARQL using Patterns", Retrieved From: https://hal.archives-ouvertes.fr/hal-01143219/document, Oct. 22, 2013, 14 Pages.
Brinkley, et al., "A Query Integrator and Manager for the Query Web", In Journal of Biomedical Informatics, vol. 45, Issue 5, Oct. 1, 2012, pp. 975-991.
"Non Final Office Action Issued in U.S. Appl. No. 16/057,229", dated Jun. 9, 2020, 8 Pages.
"Final Office Action Issued In U.S. Appl. No. 14/064,393", dated Jun. 12, 2020, 27 Pages.
"Notice of Allowance Issued in U.S. Appl. No. 14/194,700", dated Apr. 15, 2020, 9 Pages.
"Office Action and Search Report Issued in Chinese Patent Application No. 201580047507.5", dated Apr. 3, 2020, 13 Pages.
"Office Action Issued in Mexican Patent Application No. MX/a/2017/002699", dated Feb. 14, 2020, 7 Pages.
"Office Action Issued in Chinese Patent Application No. 201580047507.5", dated Sep. 28, 2020, 14 Pages.
"First Examination Report Issued in Indian Patent Application No. 201647027554", dated Sep. 14, 2020, 6 Pages.
"Non Final Office Action Issued in U.S. Appl. No. 14/296,747", dated Jan. 4, 2021, 30 Pages.
"Office Action Issued in Chinese Patent Application No. 201580047507.5", dated Jan. 11, 2021, 11 Pages.
"Final Office Action Issued in U.S. Appl. No. 14/296,747", dated Sep. 10, 2021, 31 Pages.
"Notice of Allowance Issued in U.S. Appl. No. 16/895,056", dated Sep. 20, 2021, 11 Pages.
Pang, et al., "Association-Based Recommendation of Web Information", In Proceedings of International Conference on Systems, Man and Cybernetics, vol. 7, Oct. 6, 2002, 5 Pages.
Tran, et al., "User Interest Analysis with Hidden Topic in News Recommendation System", In Proceedings of International Conference on Asian Language Processing, Dec. 28, 2010, 4 Pages.
"Notice of Allowance Issued in U.S. Appl. No. 16/895,056", dated Aug. 5, 2021, 11 Pages.
Aiello, et al., "Sensing Trending Topics in Twitter", In Journal of IEEE Transactions on Multimedia, vol. 15, Issue 6, Oct. 1, 2013, pp. 1268-1282.
Kim, et al., "Evolution of Social Networks Based on Tagging Practices", In Journal of IEEE Computer Society, vol. 6, Issue 2, Apr. 1, 2013, pp. 252-261.
"Non-Final Office Action Issued in U.S. Appl. No. 16/895,056", dated Feb. 2, 2022, 17 Pages.
"Non-Final Office Action Issued in U.S. Appl. No. 14/296,747", dated Feb. 17, 2022, 35 Pages.
"Non Final Office Action Issued in U.S. Appl. No. 16/938,085", dated May 10, 2022, 20 Pages.
"Non Final Office Action Issued in U.S. Appl. No. 17/317,969", dated Apr. 22, 2022, 14 Pages.
"Final Office Action Issued in U.S. Appl. No. 14/296,747", dated Jul. 15, 2022, 35 Pages.
"Final Office Action Issued in U.S. Appl. No. 16/895056", dated Jul. 28, 2022, 18 Pages.
"Final Office Action Issued in U.S. Appl. No. 16/938,065", dated Aug. 16, 2022, 23 Pages.
"Notice of Allowance Issued in U.S. Appl. No. 16/895,056", dated Oct. 19, 2022, 11 Pages.
"Advisory Action Issued in U.S. Appl. No. 16/938,065", dated Oct. 31, 2022, 5 Pages.
"Notice of Allowance Issued in U.S. Appl. No. 17/317,969", dated Oct. 18, 2022, 10 Pages.
Lee et al., "Dynamic Item Recommendation by Topic Modeling for Social networks,", In Proceedings of Eighth International Conference on Information Technology: New Generations, Apr. 11, 2011, pp. 884-889.
Weng, et al., "Improving Recommendation Novelty Based on Topic Taxonomy", In Proceedings of IEEE/WIC/ACM International Conferences on Web Intelligence and Intelligent Agent Technology-Workshops, Nov. 5, 2007, pp. 115-118.
"Notice of Allowance Issued in U.S. Appl. No. 16/895,056", dated Feb. 1, 2023, 11 Pages.
Melenhorst, et al., "Usefulness of Tags in Providing Access to Large Information Systems", In Proceeding of the 2007 IEEE International Professional Communication Conference, Oct. 1, 2007, 9 Pages.

* cited by examiner

UTILIZING INTERACTIVITY SIGNALS TO GENERATE RELATIONSHIPS AND PROMOTE CONTENT

BACKGROUND

The proliferation of computerized automation of processes in every aspect of life, data storage and processing have become a major component of networked systems handling social interactions. In such systems, social data is entered, modified, or deleted from a number of sources. The same data is maintained in multiple social data stores in same or different formats, and a social data store has to pick up or synchronize changes to social data based on changes in a different store. Various social data stores from simple tables to complicated databases are maintained and synchronized as new entries or modifications are made by different sources. Variety of relationships are built and broken many times within a short period of time between users of the social data. The changes are synchronized at regular intervals. In addition, variety of services are offered to enable internal and external parties' interactivity with the social data hosted by the data stores.

Legacy entity relationship models are typically incomplete despite availability of many solutions for tracking attributes of users to attempt to derive relationships such as a role of a business contact. Attributes on relationships are not supported in a generic manner. Accordingly, relationships between people may not be captured, may only be captured in unstructured form, or partially captured through explicitly defined and rigid schemas. The lack of these abilities makes it difficult to present an overview of associations between users and content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to utilization of interactivity signals to generate relationships and promote content. An analysis application may query one or more interactivity applications to retrieve interactivity signals. An interactivity signal may be an interaction pattern between a user and relations of the user that describe a relationship between the user, other users, and content. The analysis application may construct a relationship graph based on the interactivity signals. The relationship graph may chart relationships between the users associated with the interactivity signals. Next, the analysis application may promote content of a user based on the relationship graph. The content of the user may be ranked based on the relationship graph. Additionally, a weight of the interactivity signals may be adjusted to improve a ranking of the relationship graph and a ranking of the content.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
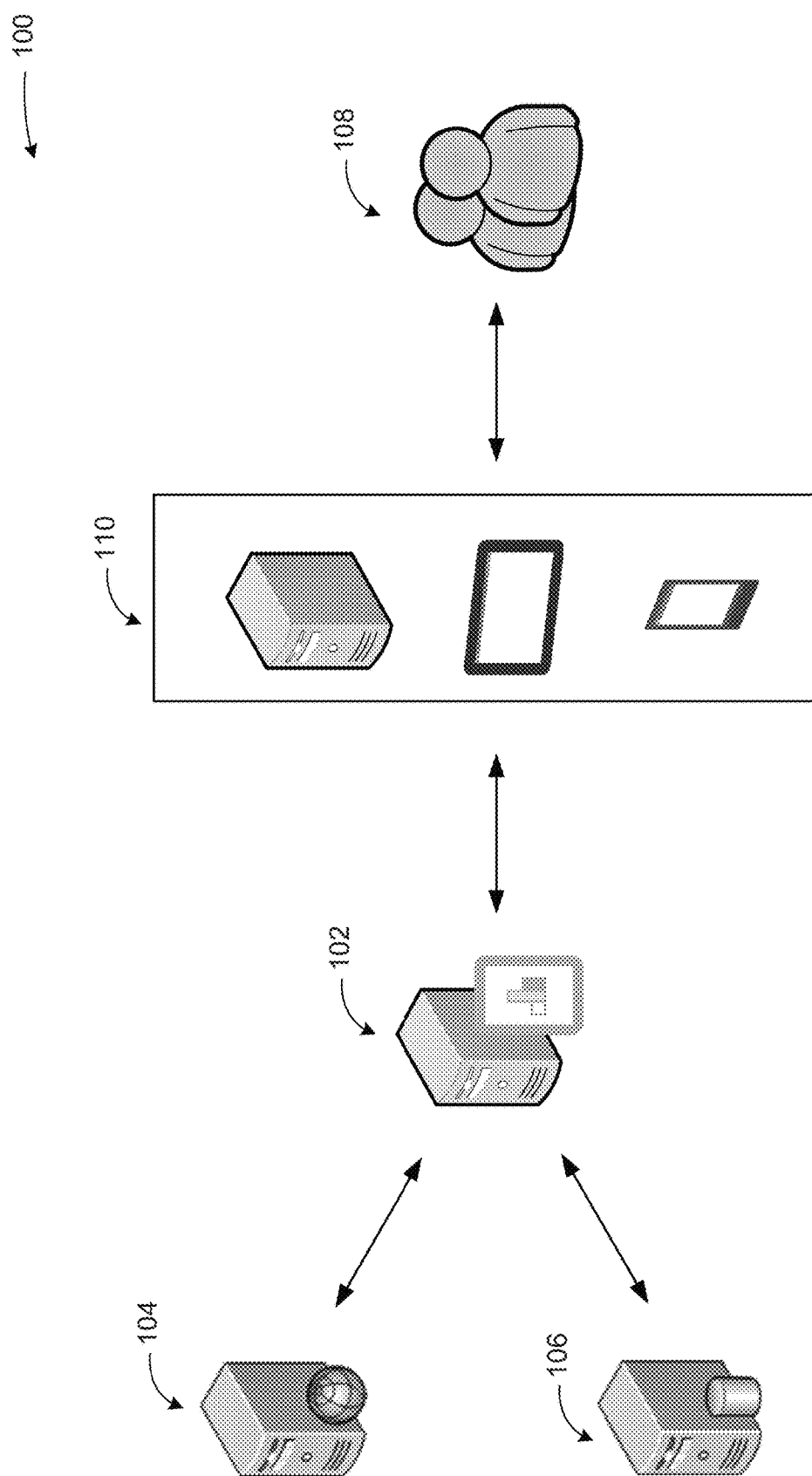
FIG. 1 is a conceptual diagram illustrating utilization of interactivity signals to generate relationships and promote content, according to embodiments.

As briefly described above, interactivity signals may be utilized to generate relationships and promote content. An analysis application may construct a relationship graph based on interactivity signals queried from interactivity applications. Content of a user may be promoted based on the relationship graph. A weight of the interactivity signals may be adjusted to improve a ranking of the relationship graph and a ranking of the content.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to utilize interactivity signals to generate relationships and promote content. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 includes a conceptual diagram 100 illustrating utilization of interactivity signals to generate relationships and promote content, according to embodiments.

An analysis application executing on a server 102 may utilize interactivity signals to generate relationships and promote content. An interactivity signal may be an interaction pattern between users. The interaction pattern may be used by the analysis application to generate a relationship between the users. A user may be a person, an item, a location, an animal, an application, and similar ones. A user may be a combination of multiple users. The interaction pattern may describe a relationship between the users and relay content between the users. In an example scenario, the analysis application may query an interactivity application to retrieve an interactivity signal between a user A, a user B, and content. The interactivity application may be an application that allows one or more interactions between the user A, the user B, and the content. The content may include a document, a message, a video clip, an audio clip, and similar ones. In addition, the interactivity signal may be an interaction pattern about a content associated with user A. The analysis application may determine a relationship between the user A and the user B based on the content referred to by the interactivity signal. The analysis application may promote the content based on the determined relationship. In the previous example, the user A and the user B are not provided as limiting examples. Other users may also use the interactivity application and partake in interactions with the user A, the user B, and the content.

The analysis application executing on server 102 may query interactivity applications executing on a content server 104 and a data server 106. In an example scenario, an interactivity application executing on content server 104 may provide interactivity services to users and content. The analysis application may query the interactivity application to retrieve interactivity signals between the users and content of the interactivity application. Alternatively, the analysis application may receive the interactivity signals from the interactivity application in a push scheme. The interactivity signals may be used to generate a relationship graph to promote content associated with a user, such as a document of the user.

In addition, the analysis application may query an interactivity application executing on the data server 106. The interactivity application executing on the data server 106 may store attributes of users such as contact information. The interactivity application may manage relationships between the users such as business, personal, social, and similar relationships. The interactivity application may also manage relationships based on interaction between the users. An example may include frequency of access.

The analysis application may retrieve the interactivity signals associated with the users from data server 106. A relationship graph may be constructed using the interactivity signals. Alternatively, a previously constructed relationship graph may be augmented by retrieving new or updated interactivity signals.

The analysis application executing on the server 102 may rank content associated with a user based on the relationship graph. An example may include documents accessed by the user as content ranked by the analysis application. The content may also be sorted by the analysis application based on frequency of access by the user and relations of the user. Relations of the user may be other users. The content may be also be sorted based on a relevancy to the user and to the relations of the user. The content may be recommended to the relations based on the frequency of access.

The ranked content may be presented to devices 110. The content may be transmitted to the devices 110 on demand, based on a received request from the devices 110 for the content. Alternatively, the server 102 may transmit the content to the devices based on a subscription for the content. The content may be presented to a viewer 108 through one or more user interfaces on devices 110. The devices 110 may include a desktop computer, a tablet computer, a notebook computer, a smart phone, and similar ones.

While the example system in FIG. 1 has been described with specific components including a server 102 utilizing interactivity signals to generate relationships and promote content, embodiments are not limited to these components or system configurations and can be implemented with other system configuration employing fewer or additional components. In an alternate example, the analysis application may be executed in server 102 along with the interactivity applications. The approaches discussed here may be applied to any compliance process provided by an application and/or a server using the principles described herein.

Figure 2:
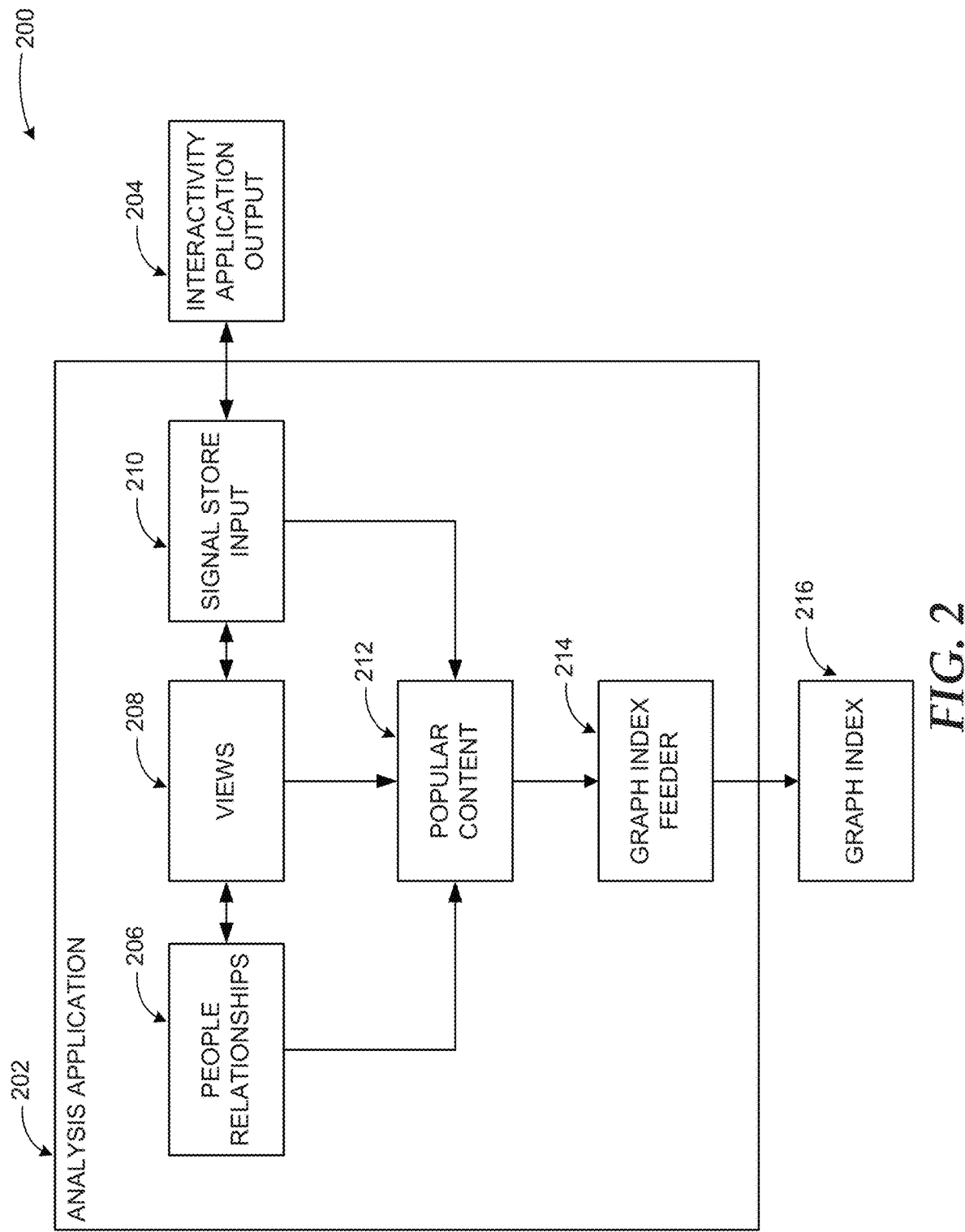
FIG. 2 is a component diagram of a scheme to utilize interactivity signals to generate relationships and promote content, according to embodiments.

FIG. 2 is a component diagram of a scheme to utilize interactivity signals to generate relationships and promote content. Diagram 200 illustrates an example of an analysis application 202 generating relationships and promoting content by using interactivity signals.

The analysis application 202 may query an interactivity application to receive interactivity application output 204. Alternatively, the analysis application may receive the interactivity application out 204 from the interactivity application in a push scheme based on a predetermined schedule or on demand. The interactivity application generating the interactivity application output 204 may include internal and external interactivity applications managing user, content, and relationship information. The interactivity application output 204 may be interactivity signals that include a recommendation establishing a relationship between users. The interactivity application output 204 may include interactivity signals associated with users that the analysis application is privileged to access.

The analysis application 202 may store interactivity signals within a signal store input 210 component. The signal store input 210 component may manage interactions with external interactivity applications including access to, query of, and retrieval of interactivity signals. The signal store input 210 component may access an interactivity application through an application programming interface (API). The API may be customized by the analysis application 202 to gain access to the interactivity signals managed by the interactivity application. Customization may include configuration of the API to establish a connection with the interactivity application.

Views 208 component of the analysis application 202 may be used to analyze views of content. The interactivity signals may associate the content with users. Views 208 component may analyze the interactivity signals to determine recentness of a view of the content within a predetermined period. The predetermined period may be a number of years, months, weeks, days, hours, seconds, and combinations of each. In an example scenario, the predetermined period may be assigned as a two weeks to consider the content as relevant to a user or relations of the user. The predetermined period example is not provided in a limiting sense, other time periods may be also be assigned as the predetermined period to consider the content relevant to the user or the relations.

People relationships 206 component may analyze interactions between the user and the relations of the user. The analysis application 202 may determine a weighted relationship between the user and the relations in response to determining a number of interactions between the user and the relations above a predetermined threshold. The predetermined threshold may be manually configured or dynamically configured based a number of criteria. Interactions may include a follow operation, a share operation, a suggestion, a collaboration, a presentation, and similar ones. The relationship may be inserted into the relationship graph.

Output from people relationships 206, views 208, and signal store input 210 components may be transmitted to a popular content 212 component for analysis. The input of the popular content 212 component may include relationships, view frequency information, and interactivity signals. The popular content 212 component may generate popular content accessed by the user and relations of the user. The popular content 212 component may generate content that may be interesting to the user based on interactions with the content by relations of the user. The relations of the user may be selected automatically or manually from a list of users derived from the interactivity signals associating the user to the relations.

The graph index feeder 214 component may analyze the relationships to produce a relationship graph. The graph index feeder 214 may chart the relationships into the relationship graph. Content such as documents analyzed by the popular content 212 module may be ranked based on the relationship graph. The graph index feeder 214 component may rank the content based on scores assigned to the content according to relationships associated with the content. The relationship graph and ranked content may be presented to a consumer through a graph index 216 that presents ranked content based on relationships of the consumer.

The analysis application 202 may use a ranking function to rank the content based on the relationship graph. According to some embodiments, following values may be used by the ranking function:

A value of $P_iS$ may include a related person score between a user and a related person i (also referred to as a relation). The value $P_iS$ may be computed by the people relationships 206 component. A person may be one of the users associated through a relationship as derived interactivity signals. The relationship may be ranked by the related person score in the relationship graph.

A value of $PD_{i,j}S$ may include a person-document score between person i and document j where document j is content associated with the person i. Based on the interactions by the person i on the document j.

A value of $D_jS$ may include a score of document j for a selected person.

A value of f may refer to a feature used to create a score between related people and documents. An example of a feature may include a number of views of a content such as a document by a person.

A value of $C_f$ may include a count of a feature such as a number of views from a person of a document.

A value of $T_f$ may include a timestamp of a last time of an occurrence of a feature event on a document by a person.

A function $\varphi_c(C_f)$ may be a count of a feature function. An example feature function may include $\varphi_c(C_f)=1$ for all $C_f$. However, embodiments are not limited to $\varphi_c(C_f)=1$ for all $C_f$.

A function $\varphi_s(X)$ may be a feature count saturation function.

A function $\varphi_r(T_f)$ may be a recentness of a feature function.

A value $W_f$ may include a feature weight. The weight may be used to adjust how a feature is to a document score. The weight of an interactivity signal may be adjusted to add a relationship or to remove a relationship from the relationship graph. Adjustment of the weight may be accomplished manually or automatically based on predetermined criteria.

The analysis application 202 may calculate a score of a document j for a person i with $$PD_{i,j}S = \varphi_s\left(\sum_{\forall f} W_f \varphi_r(T_f)\right)\varphi_c(C_f)$$

in order to relate the document j with the selected user. Links pointing to the document from a number of users are aggregated by a function of $$D_jS = \frac{\left(\sum_{\forall i: PD_{i,j}S>0} P_iS\, PD_{i,j}S\right)}{\sum_{\forall i: P_iS>0} P_iS}$$

Since the score above is depending on the value $P_iS$, (i.e. the score of the related person), documents from the people with higher scores are increased. Documents are sorted by relevancy when computing the scores $D_jS$ for documents j among users.

Feature saturation may be determined by $$\varphi_s(X) = \frac{X}{k+X}, k > 0.$$

A recentness of a feature of a document may be determined by a drop off function of: $\varphi_r(T_f)=1/(1+\alpha T_f)$, $\alpha>0$.

The examples of the ranking function are not provided in a limiting sense. Other ranking functions may be used to rank the content.

Figure 3:
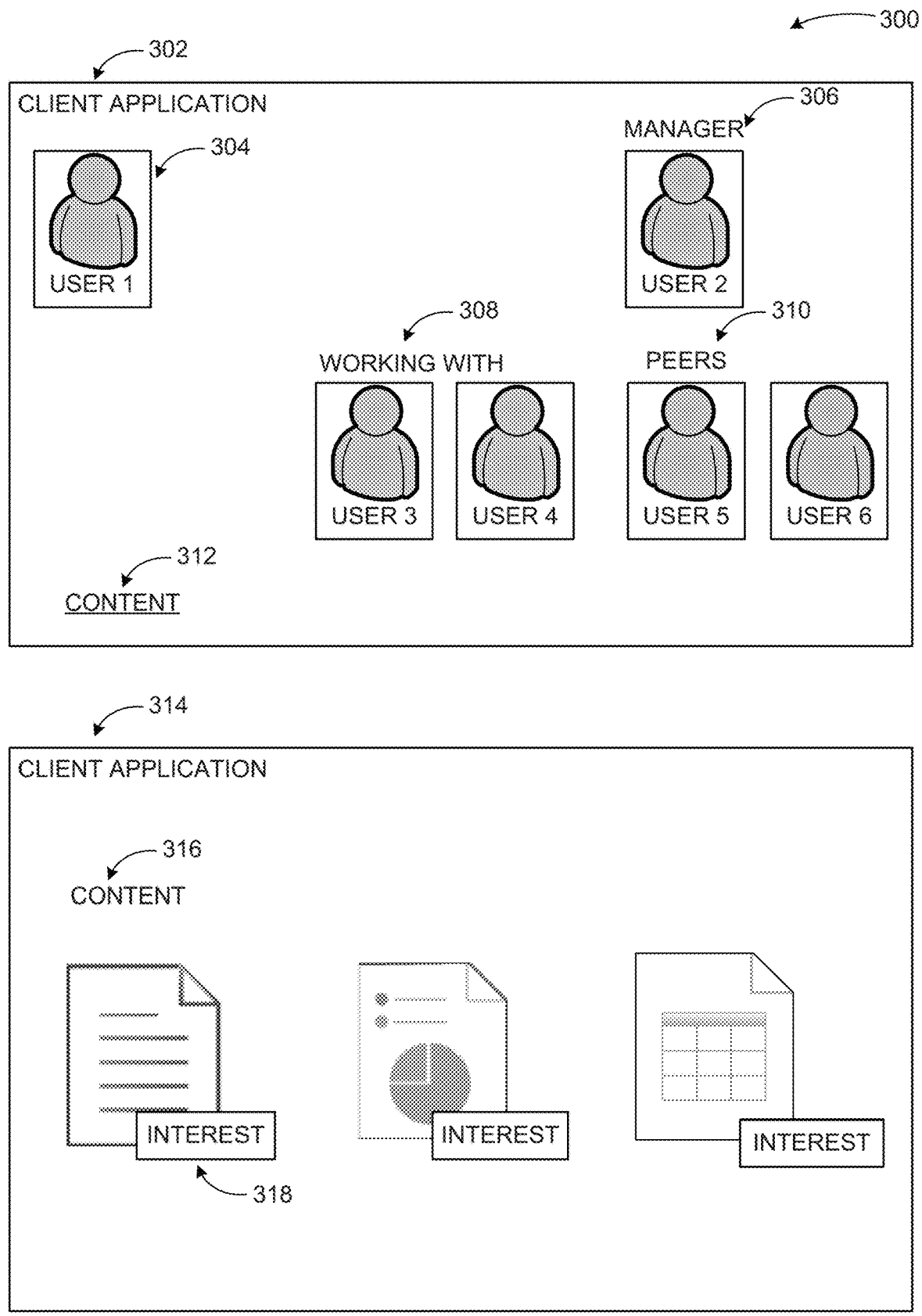
FIG. 3 illustrates examples of user interfaces displaying generated relationships and promoted content utilizing interactivity signals, according to embodiments.

FIG. 3 illustrates examples of user interfaces displaying generated relationships and promoted content utilizing interactivity signals, according to embodiments.

As shown in the diagram 300, a client application 302 may render relationships of a user 304. The user 304 may be represented through a graphic such as a headshot image and identifier information such as a name. A relationship to the user may be identified through relations 306, 308, and 310. The relations 306, 308, and 310 may identify the relationship with the user 304 through descriptive terms for the relationship including a manager, working with, and peers. Descriptive terms are not provided in a limiting sense, other descriptive terms such as family, friends, and similar ones may be used to describe a relationship between the user and the relations.

The analysis application may rank content associated with the user 304 based on a relationship graphic. In response to detecting an interaction selecting one or more of the relations of the user 304, the analysis application may rank the content associated with the user 304 and the selected relations. The ranked content may be presented to the client application 302. The client application may display an action link 312 to render the ranked content associated with the user 304 and the selected relations.

In response to detecting an activation of the action link 312, the client application 314 may display the ranked content as content 316. The content 316 may include documents, distribution lists (i.e.: email), groups, meetings, and similar content related to the user 304 and the selected relations. In addition, interest information may be provided. The interest information may include a summary of interactions between relations of the user 304 and the content 316. The interest information may provide a description of why the content may be interesting to the user based on the summary. The interest information may be transmitted to the client application to cause the client application to display the interest information within one or more interest panes 318 associated with the content 316.

The example scenarios and schemas in FIGS. 2 and 3 are shown with specific components, data types, and configurations. Embodiments are not limited to systems according to these example configurations. Utilizing interactivity signals to generate relationships and promote content may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
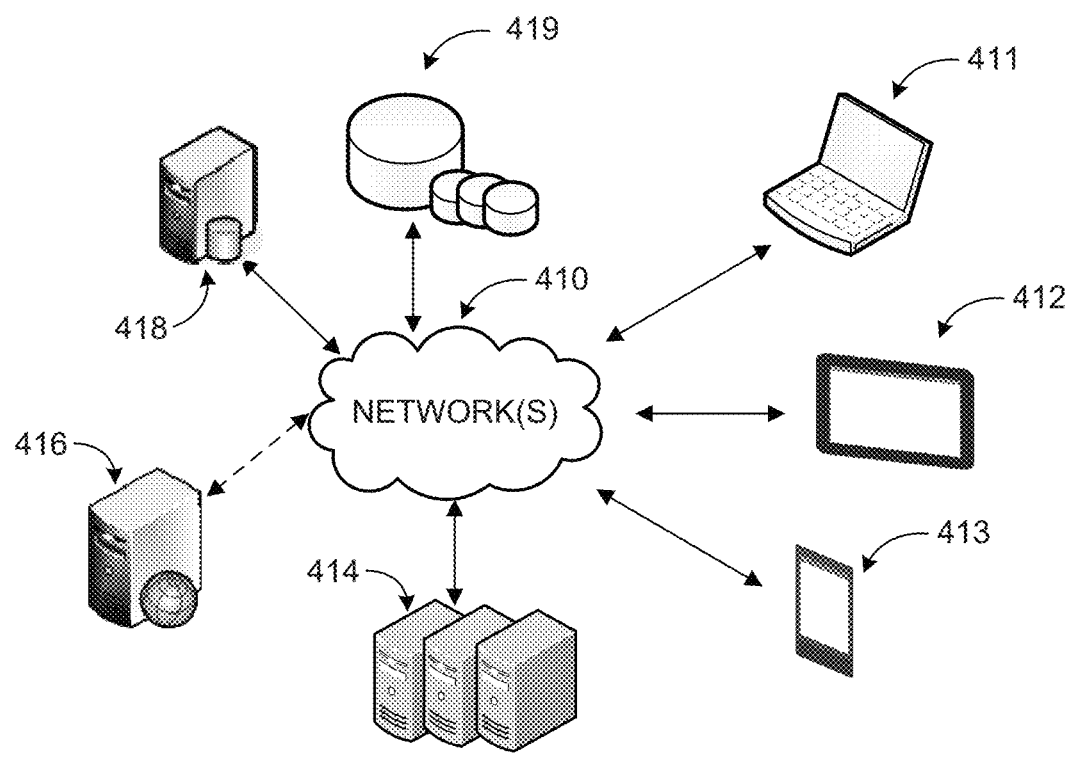
FIG. 4 is a simplified networked environment, where a system according to embodiments may be implemented.

FIG. 4 is an example networked environment, where embodiments may be implemented. A system utilizing interactivity signals to generate relationships and promote content may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An analysis application may generate a relationship graph from interactivity signals. The relationship graph may be used to rank content of a user. The ranked content may be promoted to the user and relations of the user based on the relationship. The relationship and content data may be stored in data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to utilize interactivity signals to generate relationships and promote content. Furthermore, the networked environments discussed in FIG. 4 are for illustration purposes only. Embodiments are not limited to the example applications, modules, or processes.

Figure 5:
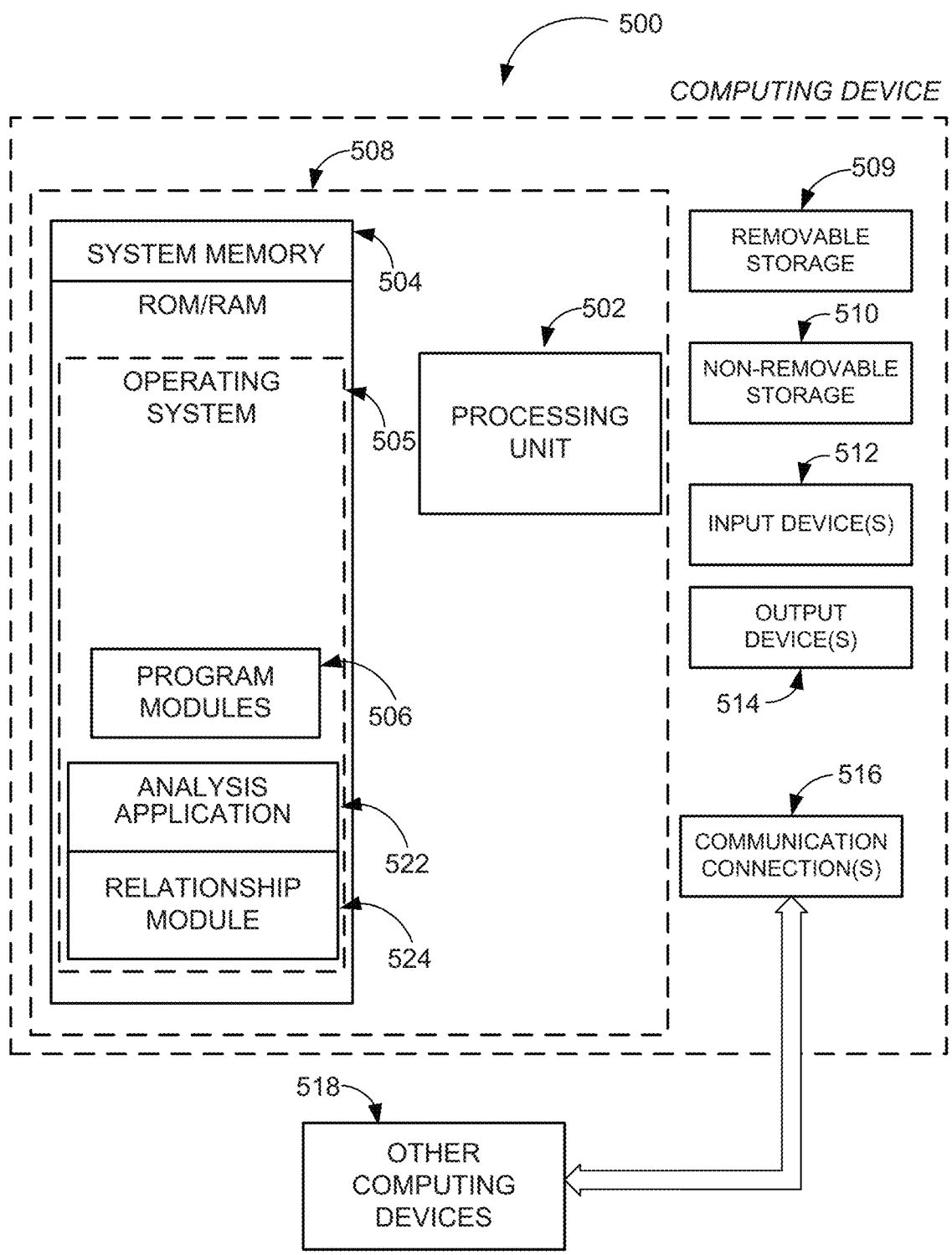
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an analysis application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, an analysis application 522, and a relationship module 524.

The analysis application 522 may query interactivity applications to retrieve interactivity signals. The analysis application 522 may generate a relationship graph from the relationships inferred in the interactivity signals. The relationship module 524 may be used to rank content associated with a user based on the relationship graph. The analysis application 522 may promote the ranked content. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
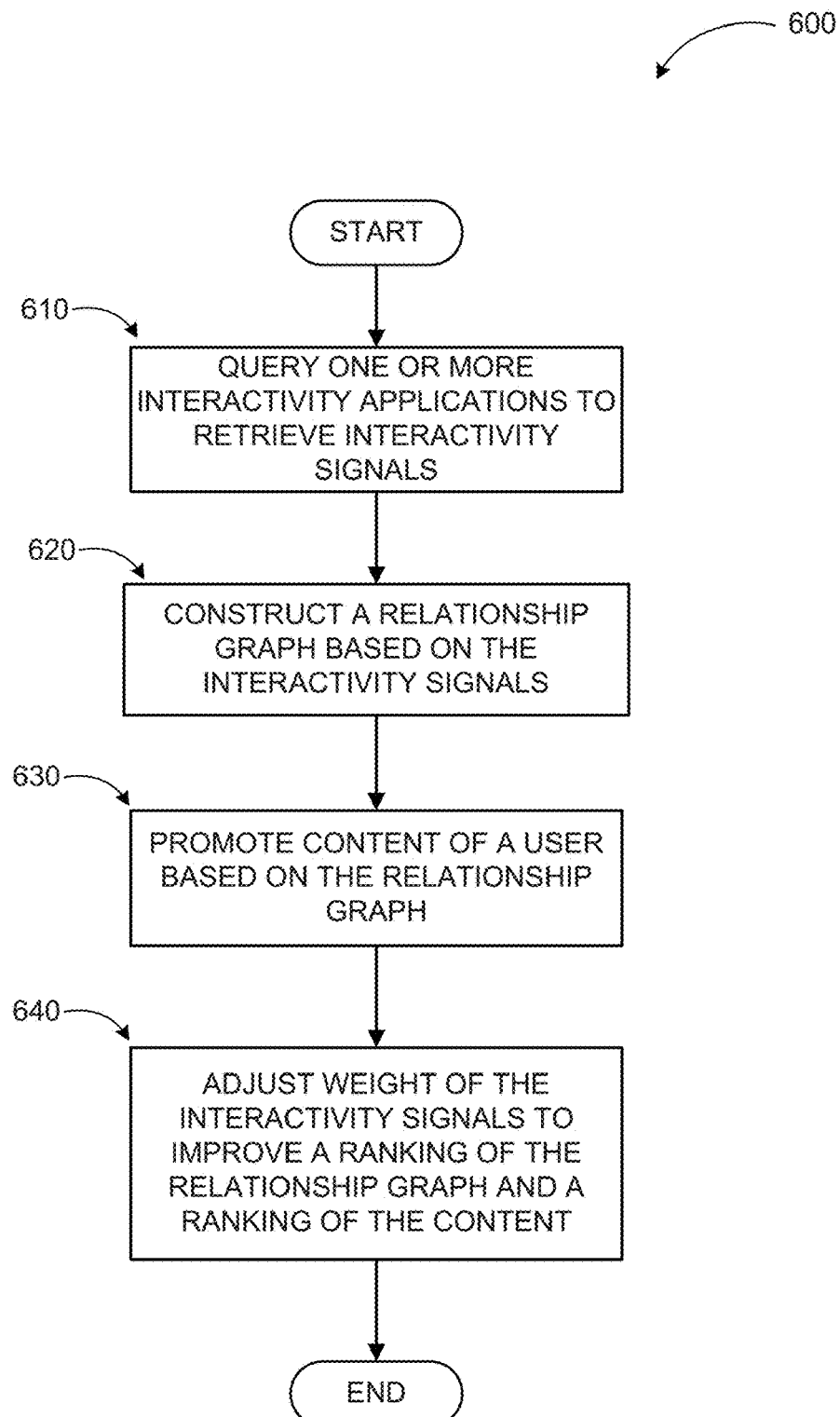
FIG. 6 illustrates a logic flow diagram for a process to utilize interactivity signals to generate relationship and promote content according to embodiments.

FIG. 6 illustrates a logic flow diagram for a process to utilize interactivity signals to generate relationships and promote content according to embodiments. Process 600 may be implemented through an analysis application.

Process 600 begins with operation 610 querying one or more interactivity applications to retrieve interactivity signals. The analysis application may construct a relationship graph based on the interactivity signals at operation 620. Content of a user may be ranked based on the relationship graph. At operation 630, content of the user may be promoted based on the relationship graph. A weight of the interactivity signals may be adjusted to improve a ranking of the relationship graph and a ranking of the content at operation 640.

According to some embodiments, a method may be provided to utilize interactivity signals to generate relationships and promote content. An example method may include querying one or more interactivity applications to retrieve interactivity signals, constructing a relationship graph based on the interactivity signals, promoting content of a user based on the relationship graph, and adjusting weight of the interactivity signals to improve a ranking of the relationship graph and a ranking of the content.

According to other embodiments, the method may include retrieving new or updated interactivity signals from the one or more interactivity applications, and augmenting the relationship graph with the new or updated interactivity signals. The content may be ranked based on the relationship graph. The content may be sorted based on a relevancy to the user and relations associated with the content. Alternatively, the content may be sorted based on a frequency of access by the user and a frequency of access by relations associated with content. Additionally, the documents may be analyzed as the content.

According to further embodiments, the method may include presenting the relationship graph and the content in a graph index. The documents as the content may be ranked based on a person-document score assigned to the documents. The person-document score may be assigned based on an association of the documents with the user and relations of the user. A relationship may be determined from one or more of the interactivity signals by computing a related person score between the user and a related person derived from the interactivity signals. The relationship may be ranked within the relationship graph based on the related person score.

According to some embodiments, a computing device (500) may be provided to utilize interactivity signals to generate relationships and promote content. The computing device may include a memory, a processor coupled to the memory. The processor may execute an analysis application in conjunction with instructions stored in the memory. The analysis application may be configured to query one or more interactivity applications to retrieve interactivity signals, construct a relationship graph based on the interactivity signals, promote content of a user by ranking the content based on the relationship graph, and adjust weight of the interactivity signals to improve a ranking of the relationship graph and a ranking of the content.

According to other embodiments, the analysis application may be further configured to analyze interactions between the user and relations of the user to determine a relationship from the interactivity signals. The relationship may be determined in response to determining a number of the interactions above a predetermined threshold, and the relationship may be inserted into the relationship graph. An application programming interface (API) may be customized to establish a connection to the one or more interactivity applications to retrieve the interactivity signals. A recentness of a view of the content may be determined within a predetermined period by the user or relations of the user by analyzing the interactivity signals. The predetermined period may be assigned as two weeks to consider the content as relevant to the user or the relations.

According to some embodiments, a computer-readable memory device may be provided to utilize interactivity signals to generate relationships and promote content. The instructions may cause a method to be performed in response to execution, the method being similar to the methods described above.

The operations included in process 600 are for illustration purposes. An analysis application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to utilize interactivity signals to generate relationships and promote content, the method comprising:
    retrieving, by an analysis application, interactivity signals from one or more interactivity applications, wherein the interactivity signals include an interaction pattern representing relationships between a first user, a plurality of users associated with the first user, and one or more content items associated with the first user and the plurality of users;
    in response to retrieving the interactivity signals, constructing a relationship graph based on the interactivity signals, wherein the relationship graph graphically charts the relationships between the first user, the plurality of users, and the one or more content items;
    computing, using the relationship graph, a first set of scores between the first user and the plurality of users, wherein the first set of scores are computed based, at least in part, on a number of interactions between the first user and the plurality of users;
    computing, using the relationship graph, a second set of scores between the plurality of users and the one or more content items, wherein the second set of scores are computed based, at least in part, on a number of interactions and a recentness of the interactions between the plurality of users and the one or more content items;
    ranking the content items based on the first set of scores and the second set of scores, wherein the ranking comprises increasing a rank of a content item in the one or more content items based on a score, from the second set of scores, between a second user in the plurality of users and the content item, wherein the second user has interacted with the content item and a score, from the first set of scores, between the first user and the second user is higher than a score, from the first set of scores, between the first user and a third user in the plurality of users;
    based on the ranking, promoting at least one of the ranked content items to the first user; and
    adjusting a weight of one or more of the interactivity signals to improve ranking of the relationship graph and ranking of the one or more content items.

2. The method of claim 1, further comprising:
    retrieving new or updated interactivity signals from the one or more interactivity applications; and
    augmenting the relationship graph with the new or updated interactivity signals.

3. The method of claim 1, further comprising:
    ranking the one or more content items further based on the relationship graph.

4. The method of claim 3, further comprising:
    sorting the one or more content items based on a relevancy of the one or more content items to the first user and the plurality of users.

5. The method of claim 3, further comprising:
    sorting the content items based on a frequency of access by the first user and a frequency of access by the plurality of users.

6. The method of claim 1, further comprising:
    providing interest information that includes a summary of interactions between the plurality of users and the one or more content items.

7. The method of claim 1, further comprising:
    presenting the relationship graph and the one or more content items in a graph index.

8. The method of claim 1, further comprising:
    ranking documents as the one or more content items based on the first set of scores and the second set of scores.

9. The method of claim 1, further comprising:
    ranking the relationships between the first user and each of the plurality of users within the relationship graph based on at least the first set of scores.

10. A computing device to utilize interactivity signals to generate relationships and promote content, the computing device comprising:
    a memory;
    a processor coupled to the memory, the processor executing an analysis application in conjunction with instructions stored in the memory, wherein the analysis application is configured to:
        retrieve interactivity signals from one or more interactivity applications, wherein the interactivity signals include an interaction pattern representing relationships between a first user, a plurality of users associated with the first user, and one or more content items associated with the first user and the plurality of users;
        in response to retrieving the interactivity signals, construct a relationship graph based on the interactivity signals, wherein the relationship graph graphically charts the relationships between the first user, the plurality of users, and the one or more content items;
        computing, using the relationship graph, a first set of scores between the first user and the plurality of users, wherein the first set of scores are computed based, at least in part, on a number of interactions between the first user and the plurality of users;
        computing, using the relationship graph, a second set of scores between the plurality of users and the one or more content items, wherein the second set of scores are computed based, at least in part, on a number of interactions and a recentness of the interactions between the plurality of users and the one or more content items;
        rank the content items based on the first set of scores and the second set of scores, wherein the ranking comprises increasing a rank of a content item in the one or more content items based on a score, from the second set of scores, between a second user in the plurality of users and the content item, wherein the second user has interacted with the content item and a score, from the first set of scores, between the first user and the second user is higher than a score, from the first set of scores, between the first user and a third user in the plurality of users;
        based on the ranking, promote at least one of the ranked content items; and
        adjust a weight of one or more of the interactivity signals to improve ranking of the relationship graph and ranking of the one or more content items.

11. The computing device of claim 10, wherein the analysis application is further configured to:
    analyze interactions between the first user and the plurality of users to determine the relationship from the interactivity signals.

12. The computing device of claim 11, wherein the analysis application is further configured to:
    determine the relationship in response to determining a number of the interactions above a predetermined threshold; and
    insert the relationship into the relationship graph.

13. The computing device of claim 10, wherein the analysis application is further configured to:
   customize an application programming interface (API) to establish a connection to the one or more interactivity applications to retrieve the interactivity signals.

14. The computing device of claim 10, wherein the analysis application is further configured to:
   determine a recentness of a view of the content items within a predetermined period by the first user or the plurality of users by analyzing the interactivity signals.

15. The computing device of claim 14, wherein the analysis application is further configured to:
   assign the predetermined period as a time period to consider the content items as relevant to the first user or the plurality of users.

16. A computer-readable memory device with instructions stored thereon to utilize interactivity signals to generate relationships and promote content, the instructions comprising:
   retrieving, by an analysis application, interactivity signals from one or more interactivity applications, wherein the interactivity signals include an interaction pattern representing relationships between a first user, a plurality of users associated with the first user, and one or more content items associated with the first user and the plurality of users;
   in response to retrieving the interactivity signals, constructing a relationship graph based on the interactivity signals, wherein the relationship graph graphically charts the relationships between the first user, the plurality of users, and the one or more content items;
   computing, using the relationship graph, a first set of scores between the first user and the plurality of users, wherein the first set of scores are computed based, at least in part, on a number of interactions between the first user and the plurality of users;
   computing, using the relationship graph, a second set of scores between the plurality of users and the one or more content items, wherein the second set of scores are computed based, at least in part, on a number of interactions and a recentness of the interactions between the plurality of users and the one or more content items;
   ranking the content items based on the first set of scores and the second set of scores, wherein the ranking comprises increasing a rank of a content item in the one or more content items based on a score, from the second set of scores, between a second user in the plurality of users and the content item, wherein the second user has interacted with the content item and a score, from the first set of scores, between the first user and the second user is higher than a score, from the first set of scores, between the first user and a third user in the plurality of users;
   based on the ranking, promoting at least one of the ranked content items, the promoting including presenting the at least one of the ranked content items via a user interface; and
   adjusting a weight of one or more of the interactivity signals to improve ranking of the relationship graph and ranking of the one or more content items.

17. The computer-readable memory device of claim 16, wherein the one or more content items are documents, and
   wherein the instructions further comprise computing, using the relationship graph, person-document scores between the plurality of users and the documents as the second set of scores.

18. The computer-readable memory device of claim 16, wherein the instructions further comprise:
   ranking the relationships between the first user and each of the plurality of users within the relationship graph based on the first set of scores.

19. The computer-readable memory device of claim 16, wherein the instructions further comprise presenting, via the user interface, a summary of interactions between at least one user and at least one of the content items.

20. The computer-readable memory device of claim 16, wherein the instructions further comprise:
   presenting the relationship graph and the one or more content items in a graph index.

* * * * *